July 26, 1932.  E. I. OLINGER  1,869,273
AGRICULTURAL MACHINE
Filed Jan. 31, 1930  2 Sheets-Sheet 1
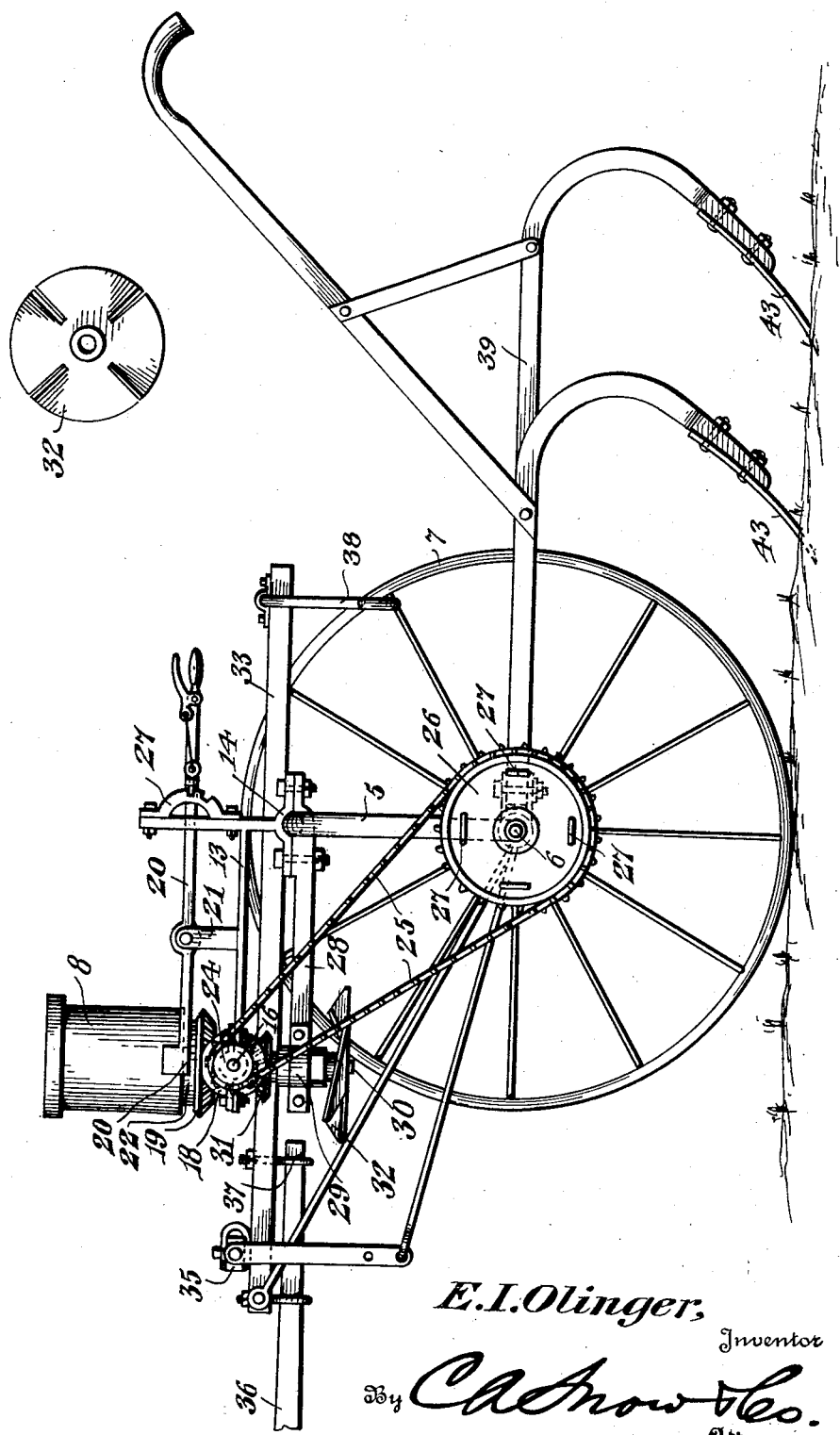

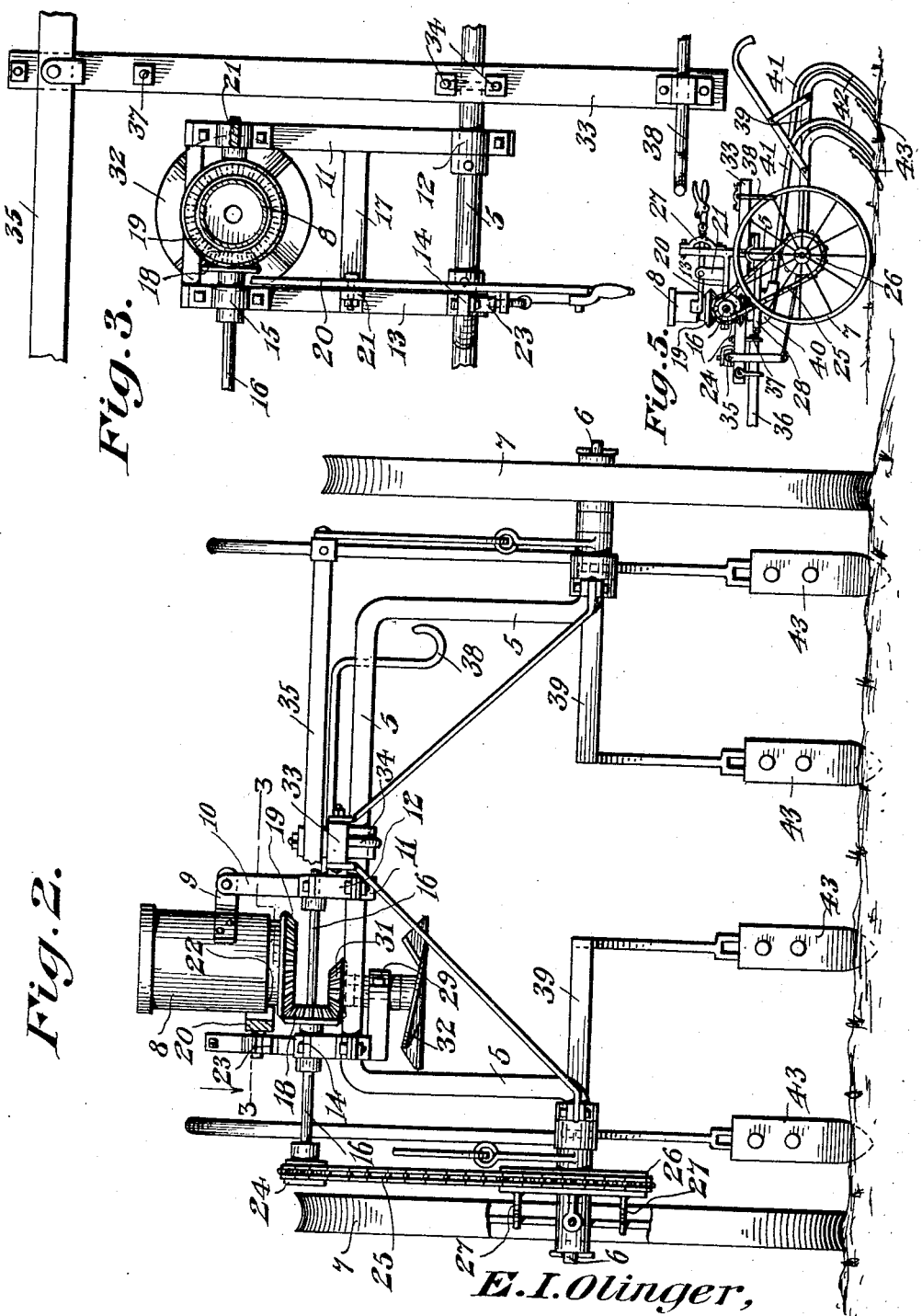

Patented July 26, 1932

1,869,273

UNITED STATES PATENT OFFICE

ELEMUEL I. OLINGER, OF POLLOCK, MISSOURI

AGRICULTURAL MACHINE

Application filed January 31, 1930. Serial No. 425,010.

This invention relates to a combination of attachments for plant cultivators and agricultural machines of all types.

An important object of the invention is to provide a planter for sewing, drilling or broadcasting which can be applied or attached to all cultivators or agricultural machines of various types so that the operator or farmer can readily equip his cultivator or machines when desired, with a simple and inexpensive device, for the purpose of planting, sewing, drilling or broadcasting of all kinds of grain, seeds or combinations of the same with fertilizer or insect powder.

Another object of the invention is to provide the farmer or operator with a combination planter and cultivator by means of which a farmer can cultivate, plant, sew, drill or broadcast at the time of cultivation or before or after cultivation, thereby combining two or more operations which will enable the operator to sew, plant, drill or broadcast catch crops.

A further object of the invention is to provide an attachment unique in design, simple in construction but reliable and durable, convenient and economical to use.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a planter constructed in accordance with the invention.

Figure 2 is a front elevational view of the planter.

Figure 3 is a sectional view taken approximately on line 3—3 of Figure 2.

Figure 4 is a plan view of the broadcasting fan.

Figure 5 is a side elevational view illustrating the planter supplied with the drilling mechanism.

Referring to the drawings in detail, the planter includes the inverted U shaped axle 5 provided with laterally extended end portions 6 on which the wheels 7 that support the machine, are mounted.

The grain box is indicated by the reference character 8, and as shown is provided with a laterally extended arm 9 that has pivotal connection with the vertical bar 10 secured to the bar 11 of the grain box supporting frame. The forward end of the bar 11 connects with the axle 5, at 12. The grain box supporting frame also includes a bar 13 that has its forward end secured to the axle 5, at 14, the bar 13 being provided with a bearing 15 to accommodate the shaft 16.

Cross bars 17 connect the bars 11 and 13 and hold the bars 11 and 13 in spaced relation with each other. Mounted on one end of the shaft 16, is a pinion 18 that meshes with the pinion 19 connected with the grain delivering disk of the grain box, so that rotary movement of the shaft 16 and pinion 18 will result in a rotary movement of the pinion 19 to cause grain to be delivered from the seed box. A lever 20 is pivotally mounted on the upstanding arm 21, and has its forward end engaging within the groove 22 at the lower end of the grain box, to the end that movement of the lever 20 will result in a vertical movement of the grain box 8, to cause the pinion 19 thereof to become disengaged from the pinion 18. A keeper 23 is provided for holding the lever in its positions of adjustment.

Mounted on the outer end of the shaft 16, is a sprocket 24 over which the chain 25 operates, the chain also operating over the sprocket 26 secured to the hub of one of the wheels 7, as by means of the arms 27. Clamped to the axle 5, is an arm 28 that extends forwardly and is provided with a bearing 29 adjacent to its forward end, the bearing 29 being designed to receive the vertical shaft 30 that carries the pinion 31 at its upper end which meshes with the pinion 18, so that rotary movement of the pinion 18 will result in a relative movement of the pinion 31 to rotate the shaft on which the pinion 31 is mounted.

On the lower end of the shaft that carries the pinion 31, is a broadcasting fan 32 which is disposed in such relation with the grain box 8, that material or grain dropping from the grain box 8 will fall directly on the blades of the fan, which throws or broadcasts the grain.

The reference character 33 designates a bar that is secured to the axle 5, by means of the clamp 34, the bar 33 providing a support for the double-tree 35, and the tongue 36, which is secured to the forward end of the bar 33 by means of the securing bolts 37.

At the rear end of the bar 33 are hooks 38 on which the shovel frames 39 may be hung, when it is desired to lift the frames 39 to move them out of operation.

In the form of the invention as shown by Figure 5, the fan 32 has been removed and replaced by the receiver 40 to which the tubes 41 are connected, the tubes having their discharge ends 42 disposed directly at the rear of the shovels 43 so that the grain may be deposited directly behind the shovels.

From the foregoing it will be obvious that due to the construction shown and described, the planter may be readily and easily converted from a planter of the drill type, into a planter of the broadcasting type, by using the broadcasting fan 32 in place of the receiver 40 and tubes 41.

It will further be seen that this device may be used for broadcasting fertilizer.

I claim:

1. An attachment for cultivators, comprising a frame including spaced horizontal bars, bearings on the frame, a shaft mounted in the bearings, a pinion mounted on the shaft and disposed intermediate the ends thereof, a grain box pivotally mounted on the frame, a grain delivering disk having a pinion, operating within the grain box, a pinion on the grain delivery disk and meshing with the first mentioned pinion to receive rotary motion therefrom, a vertical shaft under the grain box, and carrying a pinion meshing with the first mentioned pinion, a rotary broadcasting member on the vertical shaft and adapted to broadcast material disposed thereon, and means for transmitting movement to the first mentioned shaft.

2. An attachment for use on cultivators, comprising a frame embodying spaced bars, means on the frame for clamping the frame to the supporting axle of a cultivator, a supporting bar mounted on the frame, an arm pivotally mounted at the upper end of the supporting bar and extending laterally therefrom, a box mounted on the arm and having a delivering disk, a shaft mounted on the frame and extending under the hopper, a pinion on the shaft, a pinion on the delivering disk and meshing with the pinion on the shaft to receive motion therefrom, means for raising and lowering the said box to move the pinions into and out of contact, wheels on which the cultivator is supported, and means for transmitting movement of the wheels to the shaft.

In testimony that I claim the foregoing as my own, I have hereto affixed my signature.

ELEMUEL I. OLINGER.